US006794475B1

(12) United States Patent
Bialke et al.

(10) Patent No.: US 6,794,475 B1
(45) Date of Patent: Sep. 21, 2004

(54) ANTISTATIC POLYMERS, BLENDS, AND ARTICLES

(75) Inventors: Julie Vaughn Bialke, Akron, OH (US); John B. Canady, Akron, OH (US); Shui-Jen Raymond Hsu, Westlake, OH (US); Alexander V. Lubnin, Copley, OH (US); William F. Masler, III, Hinckley, OH (US); Beth A. Valentino, Broadview Hts., OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 243 days.

(21) Appl. No.: 09/609,077

(22) Filed: Jun. 30, 2000

(51) Int. Cl.$^7$ .............................................. C08F 220/68
(52) U.S. Cl. ...................... 526/320; 526/319; 526/315; 526/316; 526/328.6; 526/329.5; 525/123; 525/124; 525/379
(58) Field of Search .............................. 526/320, 329.5, 526/329.6, 315, 316, 328.6, 319; 525/123, 124, 379

(56) References Cited

U.S. PATENT DOCUMENTS

| | | | |
|---|---|---|---|
| 4,292,420 A | | 9/1981 | Turner et al. |
| 4,302,558 A | | 11/1981 | Ohya et al. |
| 4,315,081 A | * | 2/1982 | Kobayashi et al. ......... 524/141 |
| 4,384,078 A | | 5/1983 | Ohya et al. |
| 4,543,390 A | | 9/1985 | Tanaka et al. |
| 4,670,330 A | | 6/1987 | Ishiwata |
| 4,769,856 A | | 9/1988 | Reed |
| 4,872,885 A | * | 10/1989 | Tsubakimoto et al. ......... 44/280 |
| 4,920,176 A | | 4/1990 | Jorgensen, Jr. |
| 5,241,002 A | * | 8/1993 | Ohashi et al. .............. 525/123 |
| 5,326,657 A | * | 7/1994 | Suga et al. .................. 429/317 |
| 5,378,405 A | | 1/1995 | Gutman et al. |
| 5,480,953 A | * | 1/1996 | Sugaya et al. .............. 526/320 |
| 5,885,708 A | | 3/1999 | Lu et al. |
| 5,993,839 A | | 11/1999 | Mixon |
| 5,998,546 A | | 12/1999 | Li et al. |
| 6,017,997 A | | 1/2000 | Snow et al. |
| 6,020,438 A | | 2/2000 | Lubnin et al. |

FOREIGN PATENT DOCUMENTS

| | | |
|---|---|---|
| EP | 0760379 | 3/1997 |
| EP | 0989620 | 3/2000 |
| WO | WO9965958 | 12/1999 |

OTHER PUBLICATIONS

R. H. Ottewill et al, Colloid & Polymer Science, vol. 266, No. 6, pp. 547–553 (1988).
R. H. Ottewill, Emulsion Polymerization and Emulsion Polymers (Editors: P. A. Lovell and M. S. El–Aasser), J. Wiley & Sons (1997). pp. 104–106 (1997).
Emulsion Polymerization and Emulsion Polymers (Editors: P. A. Lovell and M. S. El–Aasser), J. Wiley & Sons, Chapters 1 and 6 (1997).
D. P. Tate and T. W. Bethea, Encyclopedia of Polymer Science and Engineering, vol. 2, pp. 537–590 (1985).
Kirk–Othmer Encyclopedia of Chemical Technology Third Edition, vol. 20, pp. 453–454 (1982).

* cited by examiner

Primary Examiner—Tatyana Zalukaeva
(74) Attorney, Agent, or Firm—Thoburn T. Dunlap; Hudak, Shunk & Farine Co. LPA

(57) ABSTRACT

This invention relates to latex polymers and blends of such latex polymers used to produce articles having superior electrostatic dissipative properties. The polymers and blends comprise one or more (1) polymers, in latex, or dispersion form, of (a) at least one reactive macromer of at least one alkylene oxide having at least one functional group capable of free-radical transformation, (b) optionally, at least one ethylenically unsaturated monomer having at least one carboxylic acid group, and (c) optionally, one or more free radically polymerizable comonomers, and (2) one or more other polymer latexes or dispersions of such polymers as natural rubber, conjugated-diene-containing polymers, hydrogenated styrene-butadiene triblock copolymers, chlorosulfonated polyethylenes, ethylene copolymers, acrylic and/or methacrylic ester copolymers, vinyl chloride copolymers, vinylidene chloride copolymers, polyisobutylenes, polyurethanes, polyureas, and polyurethane-urea)s.

6 Claims, No Drawings

ANTISTATIC POLYMERS, BLENDS, AND ARTICLES

FIELD OF THE INVENTION

This invention relates to polymers and their latexes, solutions, dispersions and blends used to produce gloves and other articles having superior electrostatic dissipative properties.

BACKGROUND OF THE INVENTION

Polymeric materials for use in electrostatic discharge ("ESD", "static dissipative" or "antistatic") applications fall into two categories: rubbery or thermoplastic. Typically rubbery and thermoplastic materials are used in different applications and are made by different manufacturing methods. The ESD properties are achieved by incorporating hydrophilic moieties, such as various ethoxylates, or electroconductive fillers such as carbon black, metals, or salts. Many of these systems have shortcomings. Additives by their very nature can have widely variable results due to non-uniform dispersion in the matrix. They also can lose effectiveness if they extract from the matrix and/or deteriorate over time.

Achieving ESD properties in articles that are designed to be flexible rather than rigid provides further challenges. Some of the traditional ingredients in the prior art such as carbon black, metal powders and wires, electroconductive polymers, and inorganic fillers, can stiffen an article. This is not important in plastic applications, but will present a significant issue for articles that must be flexible.

In addition, ingredients in a flexible matrix, by their very nature, are more mobile than in a plastic matrix. Flexible articles such as gloves and papers are designed to bend, flex, and stretch under contact with moist skin. These conditions are more conducive to creating motion at the molecular level, which could increase the likelihood for water-soluble materials and fillers to bloom, transfer or flake off the surface. Any particulate matter coming off articles can potentially cause damage in a critical environment where antistatic properties are desired, such as "clean room" applications and electronics manufacturing.

Traditional materials for making ESD clean room articles incorporate conductive fillers, fibers, ionic materials, carbon black, or application of a surface coating. Shortcomings of these articles include extraction or deterioration over time, non-homogeneity, and a need for humidity to dissipate static charges effectively. Many articles such as gloves used in a clean room are manufactured under special conditions to minimize particulate contamination. For example, additional post-leach or water-soak processes in glove manufacturing will remove particulate contamination.

Current gloves used in clean room environments typically are made from latexes (also known as emulsions or latex emulsions) or dispersions of natural rubbers, acrylonitrile-butadiene rubbers, styrene-butadiene rubbers, polyvinylchlorides, polychlorobutadienes, and polyurethanes. Latexes typically are prepared by polymerization of monomers in a water medium, while dispersions are prepared by distribution of polymers in a water medium following polymerization. Gloves made from these polymers under current standard conditions of compounding and processing typically have a surface resistivity of $1 \times 10^{11}$ to $1 \times 10^{13}$ ohms/square and a static decay time greater than 1 second. Specialty gloves are currently on the market which offer antistatic or conductive features, incorporate additives such as carbon black during compounding, and have published surface resistivity values as low as $1 \times 10^4$ ohms/square.

The most accepted method of glove manufacturing is the coagulant dipping process, followed by subsequent leaching and curing cycles. In this process, a preheated and cleaned glove mold (also called a "former") is dipped into a calcium nitrate salt solution, and dried to tackiness. This salt-coated mold is dipped into a compounded latex or polymer dispersion, causing the latex or polymer dispersion to coagulate on the mold and form a glove. The glove is then leached in water to remove the salt, dried and cured to achieve final properties. Thus, an essential property of the latex or polymer dispersion is its ability to coagulate, forming an article.

The most widely used approach to render polymers antistatic is incorporating a polyethyleneglycol (PEG) moiety into the backbone of the polymer. PEG is a hydrophilic material and attracts moisture into the article, thus reducing its resistivity. Since it is polymerized into the backbone of the polymer, it is not extractable. For example, U.S. Pat. No. 4,543,390 relates to graft copolymers prepared by emulsion polymerization of certain polyethyleneglycol monomers and optionally certain vinyl monomers in the presence of rubbers. The graft copolymers subsequently are blended with compatible thermoplastic resins. However, the polyethyleneglycol monomers which render polymers antistatic also yield polyvalent ion-stable polymer emulsions which are unsuitable for glove making by coagulant dipping processes. See R. H. Ottewill et al, Colloid & Polymer Science, Vol. 266, No. 6, p. 547 (1988), and R. H. Ottewill, Emulsion Polymerization and Emulsion Polymers (Editors: P. A. Lovell and M. S. El-Aaser), J. Wiley & Sons (1997). p. 104 (1997).

U.S. Pat. No. 4,302,558 and U.S. Pat. No. 4,384,078 relate to antistatic graft copolymers obtained by graft-polymerizing a vinyl or vinylidene monomer onto a rubber trunk polymer which comprises a polyalkylene oxide monomer comprising 4 to 500 alkylene oxide groups together with an ethylenic unsaturation, and a conjugated diene and/or an alkyl acrylate. However, as shown in the examples below, the graft copolymers are unsuitable for glove making by coagulant dipping processes.

SUMMARY OF THE INVENTION

Unexpectedly, this invention demonstrates that blends of certain PEG-containing latexes, solutions or dispersions with typical glove-making latexes or dispersions are suitable for making gloves and other articles by coagulant dipping processes. Also unexpectedly, certain PEG-containing latexes, solutions or dispersions are suitable for making gloves and other articles by coagulant dipping processes even in the absence of said typical glove-making latexes or dispersions. Further, articles made from the compositions of this invention are inherently static dissipative and will not bloom, rub-off or extract during use. In particular, articles such as gloves made from the compositions of this invention, and that meet ASTM examination standards for target tensile and elongation properties, will also have a surface resistivity value below $1 \times 10^{11}$ ohms/square per square, a static decay time of less than 1 second, or both.

The materials of the present invention suitable for making antistatic articles by coagulant dipping processes are blends of (A) one or more step (1) polymers (in latex, solution or dispersion form) of (a) at least one reactive macromer of at least one alkylene oxide having at least one functional group capable of free-radical transformation, (b) optionally, one or more ethylenically unsaturated monomers having at least one carboxylic acid group, and (c) optionally, one or more free radically polymerizable comonomers, and (B) one or more step (2) other polymer latexes or dispersions of such polymers as natural rubber, conjugated-diene-containing polymers, hydrogenated styrene-butadiene triblock copolymers, chlorosulfonated polyethylenes, ethylene copolymers, acrylic and/or methacrylic ester copolymers, vinyl chloride copolymers, vinylidene copolymers, polyisobutylenes, polyurethanes, polyureas, and poly (urethane-urea)s. The term "free-radical transformation" means being capable of reacting by a free-radical mechanism, examples including free-radically polymerizable monomers, chain transfer agents, or chain terminating agents.

Also suitable for making antistatic articles by coagulant dipping processes, even in the absence of said step (2) other polymer latexes or dispersions, are step (1) polymers (in latex, solution or dispersion form) of (a) at least one reactive macromer of at least one alkylene oxide having at least one functional group capable of free-radical transformation, wherein said macromer comprises less than about 10 wt. % of total polymer weight in the step (1) latex, solution or dispersion (b) optionally, one or more ethylenically unsaturated monomers having at least one carboxylic acid group, and (c) one or more free radically polymerizable comonomers.

DETAILED DESCRIPTION

The blends of the present invention comprise (A) one or more step (1) polymers (in latex, solution or dispersion form) of (a) at least one reactive macromer of at least one alkylene oxide having at least one functional group capable of free-radical transformation, (b) optionally, one or more ethylenically unsaturated monomers having at least one carboxylic acid group, and (c) optionally, one or more free radically polymerizable comonomers, and (B) and one or more step (2) other polymer latexes or dispersions.

In step (1) the (a) at least one reactive macromer of at least one alkylene oxide having at least one functional group capable of free-radical transformation is reacted to form latexes, solutions or dispersions with (b) optionally, one or more ethylenically unsaturated monomers having at least one carboxylic acid group, and (c) optionally, one or more radically polymerizable monomers, such as acrylic esters, methacrylic esters, conjugated dienes, styrenic monomers, vinyl esters, vinyl ethers, conjugated dienes, unsaturated nitrites and other polar monomers.

The following definitions apply throughout this specification. All weight percentages of polymers, latexes, and other materials are expressed on a dry weight basis. The term "polymer" refers to homopolymers as well as copolymers. The term "step (1) polymer" or "polymer (1)" means a latex-forming, solution-forming or dispersion-forming polymer that is the primary component of a respective step (1) latex, solution or dispersion. Similarly, the terms "step (2) polymer" or "polymer (2)" means a latex-forming or dispersion-forming polymer that is the primary component of a respective step (2) other polymer latex or dispersion. The term "step (1) composition" means a step (1) latex, solution or dispersion. Similarly, the term "step (2) composition" means a step (2) other polymer latex or dispersion. The term "other polymer latex or dispersion" means a latex or dispersion other than a step (1) polymer latex or dispersion. The term "polymerized units" means polymerized monomeric molecules, e.g., polybutadiene can be said to comprise polymerized units or molecules of butadiene monomer.

Polymerized reactive macromer (a) typically may comprise from about 0.1 wt. % to 100 wt. %, preferably from about 1 wt. % to about 30 wt. %, of the step (1) polymer. Polymerized monomer (b) typically may comprise from 0 wt. % to about 10 wt. %, preferably from about 3 wt. % to about 7 wt. %, of the step (1) polymer. Polymerized monomer (c) typically may comprise from 0 wt. % to about 99 wt. %, preferably from about 1 wt. % to about 70 wt. %, of the step (1) polymer.

One or more one step (1) compositions are then blended with one or more step (2) compositions incorporating polymers such as those of natural rubber, conjugated-diene-containing polymers, hydrogenated styrene-butadiene triblock copolymers, chlorosulfonated polyethylenes, ethylene copolymers, acrylic and/or methacrylic ester copolymers, vinyl chloride copolymers, vinylidene copolymers, polyisobutylenes, polyurethanes, polyureas, and poly (urethane-urea)s. The step (2) compositions typically may comprise from about 2 wt. % to about 99.5 wt. %, and preferably from about 50 wt. % to about 99 wt. %, of the blend of step (1) compositions and step (2) compositions.

Reactive macromers of alkylene oxides having at least one functional group capable of free-radical transformation are well known in the prior art. Such macromers have the formula (I):

$$X-(Y-O)_n-Z \qquad (I)$$

wherein Y is a straight or branched chain alkylene radical having 1 to 6 carbon atoms, preferably 2 to 4 carbon atoms, X is a functional group capable of free-radical transformation, such as acrylate, which may be represented by the formula $H_2C=CHC(O)O-$, methacrylate, which may be represented by the formula $H_2C=C(CH_3)C(O)O-$, allyl ether, which may be represented by the formula $H_2C=CHCH_2O-$, vinyl ether, which may be represented by the formula $H_2C=CHO-$, vinylbenzyl, vinylsulfonic ester, which may be represented by the formula $H_2C=CHSO_3-$, or mercaptan, Z is H, $C_mH_{2m+1}$, phosphate, or the same as X, and m is 1 to 8, preferably 1 to 3. "n" may vary to achieve the desired molecular weight (average) set forth below. Z is preferably H or methyl. X is preferably acrylate or methacrylate. Examples of suitable reactive monomers include methoxy polyethylene oxide (meth)acrylate (also known as methoxypolyethylene glycol methacrylate or "MePEGMA"), methoxy polyethylene oxide allyl ether, polyethylene oxide allyl ether, butoxy polyethylene oxide (meth)acrylate, p-vinylbenzyl terminated polyethylene oxide, polyethylene oxide di(meth) acrylate, polyethylene oxide thiol, polyethylene oxide maleimide, polyethylene oxide vinylsulfone, and the like. Mixtures of the reactive macromers may also be used. Preferred reactive macromers include methoxy polyethylene oxide (meth)acrylate, methoxy polyethylene oxide allyl ether, and polyethylene oxide allyl ether. Suitable reactive macromers may have molecular weights (average) from about 100 to about 10,000, preferably from about 100 to about 5,000, and more preferably from about 300 to about 2,000.

Unexpectedly, it was discovered that the step (1) compositions can be used without the step (2) compositions in making articles such as gloves by the coagulant dipping process described hereafter, provided that the amount of polymerized units of at least one reactive macromer of at least one alkylene oxide having at least one functional group capable of free-radical transformation is present but comprises less than about 10 wt. %, preferably less than about 8 wt. %, and more preferably less than about 6 wt. % of total polymer weight in the step (1) composition.

The step (1) compositions preferably include polymerized units of at least one ethylenically unsaturated monomer having at least one carboxylic acid group, and preferably one or two carboxylic acid groups. Examples of such monomers include acrylic acid, methacrylic acid, itaconic acid, maleic acid, maleic anhydride, fumaric acid, crotonic acid, vinylacetic acid, mesaconic acid, citraconic acid, 2-acrylamido-2-methylpropanesulfonic acid, alkali metal salts of the above acids and amine or ammonium salts thereof. Acrylic acid and methacrylic acid are preferred. The polymerized ethylenically unsaturated monomers having at least one carboxylic acid group typically may comprise from 0 wt. % to about 10 wt. %, preferably from about 3 wt. % to about 7 wt. %, of polymer (1). Presence of the polymerized ethylenically unsaturated monomer having at least one carboxylic acid group as part of polymer (1) is desirable for the coagulant dipping processes described hereafter, but not for other glove making processes known to those skilled in the art.

Optionally one or more free radically (or "radically") polymerizable comonomers may be useful in preparing polymer (1) of the step (1) compositions. Examples of such radically polymerizable comonomers include acrylic esters, methacrylic esters, unsaturated nitriles, styrenic monomers, vinyl esters, vinyl ethers, conjugated dienes, other monomers, and mixtures thereof.

Acrylic esters and methacrylic acid esters useful in preparing the step (1) compositions include those having the formula II:

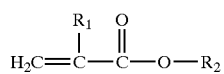

(II)

wherein $R_1$ is hydrogen or a methyl group, and $R_2$ contains 1 to 12 carbon atoms and optionally also one or more sulfur, nitrogen, halogen or oxygen atoms. Preferably $R_2$ is an ethyl or butyl group. Examples of suitable acrylate esters include methyl acrylate, ethyl acrylate, n-propyl acrylate, isopropyl acrylate, n-butyl acrylate, 2-ethylhexyl acrylate, and n-decyl acrylate. Examples of suitable methacrylate esters include methyl (meth)acrylate, ethyl (meth)acrylate, n-propyl (meth)acrylate, n-butyl (meth)acrylate, isopropyl (meth) acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth) acrylate, N,N-dimethylaminoethyl (meth)acrylate, N,N-diethylaminoethyl (meth)acrylate, t-butylaminoethyl (meth) acrylate, 2-sulfoethyl (meth)acrylate, trifluoroethyl (meth) acrylate, glycidyl (meth)acrylate, benzyl (meth)acrylate, allyl (meth)acrylate, 2-n-butoxyethyl (meth)acrylate, 2-chloroethyl (meth)acrylate, sec-butyl-(meth)acrylate, tert-butyl (meth)acrylate, 2-ethylbutyl (meth)acrylate, cinnamyl (meth)acrylate, crotyl (meth)acrylate, cyclohexyl (meth) acrylate, cyclopentyl (meth)acrylate, 2-ethoxyethyl (meth) acrylate, furfuryl (meth)acrylate, hexofluoroisopropyl (meth)acrylate, methallyl (meth)acrylate, 3-methoxybutyl (meth)acrylate, 2-methoxybutyl (meth)acrylate, 2-nitro-2-methylpropyl (meth )acrylate, n-octyl (meth )acrylate, 2-ethylhexyl (meth)acrylate, 2-phenoxyethyl (meth) acrylate, 2-phenylethyl (meth)acrylate, phenyl (meth) acrylate, propargyl (meth)acrylate, tetrahydrofurfuryl (meth)acrylate, norbornyl (meth)acrylate, acrylamide and its derivatives, and tetrahydropyranyl (meth)acrylate. Mixtures of acrylic and methacrylic acid esters may be used. The polymerized acrylic and methacrylic acid esters typically may comprise from 0 wt. % to about 50 wt. %, from 0 wt. % to about 20 wt. %, and more preferably from 0 wt. % to about 10 wt. %, of polymer (1).

Suitable unsaturated nitrile monomers useful in preparing the step (1) compositions include acrylonitrile or an alkyl derivative thereof, the alkyl preferably having from 1 to 4 carbon atoms, such as acrylonitrile, methacrylonitrile, and the like. Also suitable are unsaturated monomers containing a cyano group such as those having the formula III:

(III)

wherein R is H or $C_nH_{2n+1}$ and n is 1 to 4 carbon atoms. Other examples of unsaturated nitrile monomers include $CH_2=C(CN)_2$, $CH_3-CH=CH-CN$, $NC-CH=CH-CN$, 4-pentenenitrile, 3-methyl-4-pentenenitrile, 5-hexenenitrile, 4-vinyl-benzonitrile, 4-allyl-benzonitrile, 4-vinyl-cyclohexanecarbonitrile, 4-cyanocyclohexene, and the like. Mixtures of the unsaturated nitriles may also be used. Acrylonitrile and methacrylonitrile are preferred. The polymerized unsaturated nitrile monomers typically may comprise from 0 wt. % to about 60 wt. %, preferably from about 5 wt. % to about 45 wt. %, of polymer (1).

The "styrenic monomers" useful in preparing the step (1) compositions may be defined as monomers containing a carbon-carbon double bond in alpha-position to an aromatic ring. The styrenic monomers may be represented by the following formulae:

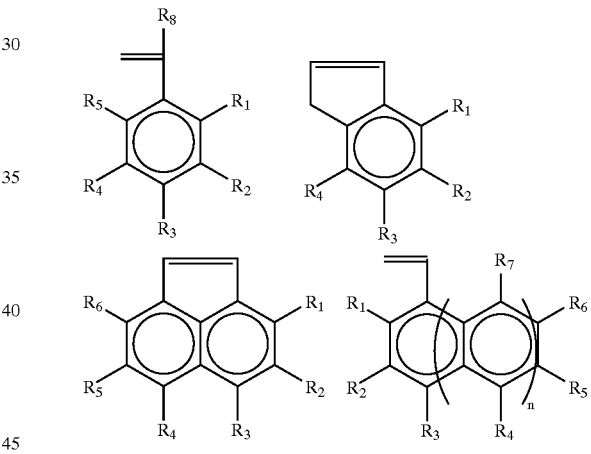

wherein n is an integer from 0 to 2; $R_1$, $R_2$, $R_3$, $R_4$, $R_5$, $R_6$, and $R_7$ are selected from the group consisting of H, $CH_3$, $C_mH_{2m+1}$, OH, $OCH_3$, $OC_mH_{2m+1}$, COOH, $COOCH_3$, $COOC_mH_{2m+1}$, Cl and Br, m is an integer from 2 to 9, and $R_8$ is selected from the group consisting of H, $CH_3$, $C_mH_{2m+1}$, and $C_6H_5$.

Examples of suitable styrenic monomers useful in preparing step (1) compositions include styrene, alpha-methylstyrene, tertiary butylstyrene, ortho-, meta-, and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, ortho-, meta- and para-methoxystyrene, indene and its derivatives, vinyinaphthalene, diverse vinyl (alkyl-naphthalenes) and vinyl (halonaphthalenes) and mixtures thereof, acenaphthylene, diphenylethylene, and vinyl anthracene. Mixtures of styrenic monomers also may be used. Styrene is preferred. The polymerized styrenic monomers typically may comprise from 0 wt. % to about 65 wt. %, preferably from about 5 wt. % to about 40 wt. %, of polymer (1).

Vinyl ester monomers derived from carboxylic acids containing 1 to 14 carbon atoms also may be useful in preparing the step (1) compositions. Examples of such vinyl ester monomers include vinyl acetate, vinyl propionate, vinyl hexanoate, vinyl 2-ethylhexanoate, vinyl octanoate, vinyl pelargonate, vinyl caproate, neo esters of vinyl alcohol, vinyl laurate, and the like, as well as mixtures thereof. The polymerized vinyl ester monomers typically may comprise from 0 wt. % to about 99.5 wt. %, preferably from 0 wt. % to about 30 wt. %, of polymer (1).

Vinyl ethers may be useful in preparing the step (1) compositions. Examples of vinyl ethers include methyl-, ethyl-, butyl, iso-butyl vinyl ethers and the like. The polymerized vinyl ether monomers typically may comprise from 0 wt. % to about 50 wt. %, preferably from 0 wt. % to about 30 wt. %, of polymer (1).

Conjugated diene monomers containing 4 to 10 carbon atoms, and preferably from 4 to 6 carbon atoms, also may be useful in preparing the step (1) compositions. Examples of such conjugated diene monomers include butadiene, isoprene, cis-1,3-pentadiene, trans-1,3-pentadiene, cis-1,3-hexadiene, trans-1,3-hexadiene, 2-ethylbutadiene, 2-n-propylbutadiene, 2-i-propyl butadiene, 2-t-butylbutadiene, 2-amylbutadiene, 2-n-octylbutadiene, 4-methylpentadiene, cis-3-methylpentadiene, trans-3-methylpentadiene, cis-2-methylpentadiene, trans-2-methylpentadiene, 2,3-dimethylbutadiene, cis,cis-2, 4-hexadiene, cis,trans-2,4-hexadiene, trans,trans-2,4-hexadiene, 2-methyl-3-ethylbutadiene, 2-methyl-3-i-propylbutadiene, 2-methyl-3-n-butylbutadiene, myrcene, cis-1-phenylbutadiene, trans-1-phenylbutadiene, 2-phenyl butadiene, 1,3-cyclopentadiene, 1,3-cyclohexadiene, 2-fluorobutadiene, 1-chlorobutadiene, 2-chlorobutadiene, 2,3-dichlorobutadiene, 2-bromobutadiene, sorbic acid, cis-1-cyanobutadiene, 2-methoxybutadiene and like, as well as mixtures thereof. Butadiene is more preferred. The polymerized conjugated diene monomers typically may comprise from 0 wt. % to about 99.5 wt. %, preferably from 0 wt. % to about 70 wt. %, of polymer (1).

Other monomers may be useful in preparing the step (1) compositions, including polar monomers such as hydroxyalkyl (meth)acrylates, acrylamides and substituted acrylamides, sodium styrene sulfonate and sodium vinyl sulfonate, N-vinyl-2-pyrrolidone, N-vinyl caprolactam, diallyl phthalate, dimethyl aminoethyl (meth)acrylate, and dimethylaminopropyl methacrylamide. Dimethyl acrylamide, dimethyl aminoethyl acrylamide, dimethyl aminoethyl (meth)acrylate, and dimethylaminopropyl methacrylamide are preferred. Mixtures of polar monomers also may be used. The polymerized polar monomers typically may comprise from 0 wt. % to about 30 wt. %, preferably from about 1 wt. % to about 20 wt. %, of polymer (1).

The step (1) compositions may be prepared by free radical polymerization methods well known to those skilled in the art, such as described in "Emulsion Polymerization and Emulsion Polymers" (Editors: P. A. Lovell and M. S. El-Aaser), J. Wiley & Sons (1997).

The step (2) compositions and their preparation are described in the prior art. Such step (2) compositions incorporate well-known commercial polymers such as natural rubber, conjugated-diene-containing polymers including butadiene-containing copolymers with acrylonitrile and/or styrene such as nitrile rubbers and SBR rubbers, polychlorobutadiene (Neoprene), hydrogenated styrene-butadiene triblock copolymers (such as Kraton™ copolymers from Shell Chemical), chlorosulfonated polyethylene (such as Hypalon™ polymers from E.I. duPont), ethylene copolymers (such as EPDM copolymers), acrylic and/or methacrylic ester copolymers such as Hycar® acrylic copolymers from BFGoodrich), vinyl chloride copolymers, vinylidene copolymers, polyisobutylenes, polyurethanes, polyureas, and poly(urethane-urea)s. Among preferred step (2) compositions are those comprising conjugated-diene-containing polymers, such as butadiene-containing copolymers with acrylonitrile and/or styrene (e.g., nitrile rubbers), as well as polychlorobutadienes.

Suitable step (2) compositions include those described in the following U.S. Patents, all of which are incorporated herein by reference.

For example, U.S. Pat. No. 4,920,176 relates to emulsion polymerization in order to prepare nitrile rubber (NBR) latexes. Generally, nitrile latexes comprise polymerized units of butadiene, acrylonitrile, and acrylic acid or methacrylic acid. Additional comonomers can be included to change or improve polymer properties. These include vinylpyridine, acrylic and methacrylic ester monomers, chlorobutadiene, cross-linking agents, styrenic monomers, and the like.

A review article by D. P. Tate and T. W. Bethea, Encyclopedia of Polymer Science and Engineering, Vol. 2, p.537, further describes polymers and copolymers of conjugated dienes such as butadiene rubber (BR), acrylate-butadiene rubber (ABR), chloroprene rubber (CR), isoprene rubber (IR), and styrene-butadiene rubber (SBR).

U.S. Pat. Nos. 4,292,420 and 6,020,438 relate to emulsion polymerization in order to prepare vinyl chloride latexes. Rigid polyvinylchloride can be softened by the use of plasticizers, such as 2-ethylhexyl phthalate, or by copolymerizing vinyl chloride with "soft"monomers (the so-called internal plasticization monomers), which render soft copolymers with vinyl chloride. Such "soft" monomers include long-chain acrylic and methacrylic esters, vinyl esters, vinyl ethers, acrylamides, and methacrylamides, and are exemplified by butyl acrylate, 2-ethylhexyl methacrylate, vinyl propionate, n-octylacrylamide and the like.

U.S. Pat. No. 6,017,997 relates to preparation of waterborne polyurethane, polyurea, and poly(urethane-urea) dispersions ("PUD").

Generally PUD comprises polymerized units of diisocyanate and hydrophylic moiety, together with diol, diamine, or both diol and diamine. However, all four units can have pre-polymerization functionality (i.e., number of reactive groups) higher than two. Diisocyanates can be aliphatic, such as 1,6-hexamethylene diisocyanate, cyclohexane-1,4 (or -1,3)-diisocyanate, isophorone diisocyanate, bis-(4-isocyanatocyclohexyl)-methane, 1,3- and 1,4-bis (isocyanatomethyl)cyclohexane bis-(4-isocyanato-3-methyl-cyclohexyl)-methane, tetramethyl xylylene diisocyanate, and the like.

Diisocyanates can also be aromatic, such as 2,4-diisocyanato toluene, 2,6-diisocyanato toluene, 4,4-diisocyanato diphenyl methane, and the like.

The following exemplary diols (or polyols) can be used in preparing the aforesaid PUD:

(1) Polyesters of (a) dibasic carboxylic acids, such as succinic acid, adipic acid, suberic acid, azelaic acid, sebacic acid, phthalic acid, isophthalic acid, and the like, and (b) dihydric alcohols, which include ethylene glycol, propylene glycol, butylene glycol, 1,6-hexanediol, neopentyl glycol, 1,4-bis-hydroxymethylcyclohexane, 2-methyl-1,3-propanediol; 2,2,4-trimethyl-1,3-pentanediol, polypropylene glycol, dibutylene glycol, and the like.

(2) Polycarbonate polyols containing hydroxyl groups, including those obtained from the reaction of diols, such as 1,3-propanediol, 1,4-butanediol and/or 1,6-hexanediol, diethylene glycol, triethylene glycol or tetraethylene glycol with diarylcarbonates or phosgene.

(3) Polyether polyols including polymers of alkylene oxides, such as ethylene oxide, propylene oxide, butylene oxide, styrene oxide, tetrahydrofuran, epichlorohydrin, and the like.

(4) Polyacetal polyols prepared by reacting aldehydes, such as formaldehyde with glycols, such as diethylene glycol, triethylene glycol, ethoxylated 4,4'-dihydroxydiphenyldimethylmethane, 1,6-hexanediol, and the like.

Diamines useful in preparing the aforesaid PUD include hydrazine, 1,2-diaminoethane, 1,6-diaminohexane, 2-methyl-1,5-pentanediamine, 2,2,4-trimethyl-1,6-hexanediamine, and the like.

In order to enable a PUD to make a stable dispersion in an aqueous medium, a hydrophilic moiety having anionic or potential anionic groups and, optionally, hydrophilic ethylene oxide units, is chemically incorporated into the PUD. The most preferred hydrophylic moiety is dimethylol propionic acid.

Well-known initiators are used in preparing the step (1) compositions and step (2) compositions, preferably a persulfate initiator, and most preferably sodium persulfate. Other initiators suitable for use include ammonium persulfate, potassium persulfate, peroxides, azo compounds, and known redox initiators such as tert-butyl hydroxy peroxide/sodium formaldehyde sulfoxylate. The initiator for preparing both step (1) compositions and step (2) compositions is preferably present in an amount from about 0.2 wt. % to about 2 wt. % based on the total weight of the polymer.

Well-known crosslinking and branching agents may be useful in preparing the step (1) compositions and step (2) compositions, such as multifunctional (meth)acrylates, (meth)acrylamides, and vinyl and allyl ethers. Examples include ethylene glycol dimethacrylate, 1.6-hexanedioldiacrylate, methylene bis-acrylamide, polybutadiene diacrylates, polyurethane diacrylates, trimethylolpropane trimethacrylate, pentaerythritol tetraallyl ether, allyl methacrylate, allyl acryloxypropionate, 4-acryloxybenzophenone, diallyl maleate, divinylbenzene, and the like. Mixtures of crosslinking and branching agents may also be used.

Another optional ingredient in the preparation of the step (1) compositions and step (2) compositions is a chain transfer agent. Useful agents include alcohols, mercaptans, halogenated compounds and mixtures thereof. Preferred agents are mercaptans. Where used, the chain transfer agent is present in an amount from about 0.1 wt. % to about 3 wt. %, preferably from about 0.1 wt. % to about 0.5 wt. % based on the total weight of the polymer.

Yet another optional ingredient in the preparation and processing of the step (1) compositions is one or more salts. The salts may be added at any time during polymerization, blending with step (2) compositions, compounding, curing, or post-processing of the compositions including during manufacture of articles. Suitable salts include LiCl, LiNO$_3$, LiOH, LiCF$_3$SO$_3$, Li$_2$SO$_4$, and the like. Lithium nitrate is preferred. Salts typically may be used at a concentration from about 0.5 wt. % to about 10 wt. % based on the total weight of the polymer.

A step (1) composition is blended into a step (2) composition, or vice versa, with mild stirring. Additives such as activators, stabilizers, plasticizers, cross-linking and branching agents, curing agents, such as sulfur, colorants, pigments, colorants, neutralizing agents, waxes, slip and release agents, antimicrobial agents, surfactants, metals, antioxidants, UV stabilizers, antiozonants, and the like, can optionally be added to the separate latexes, to blends of the two latexes, or during manufacture of articles. Other additives may be used as appropriate in order to make dipped articles (especially flexible articles, such as gloves), or to impregnate, saturate, spray or coat papers, non-woven materials, textiles, wood, and a variety of other substrates. Applications include gloves; papers and non-wovens; fibrous materials such as textiles; rubber and plastic films, sheets, composites, and other articles such as walk-off mats; inks; adhesives; and other compositions and articles typically used in electronics, clean rooms, and automotive areas. Such articles made at least partially or even wholly (but appropriately compounded with additives, such as those described above) from the compositions of the present invention are inherently static dissipative and will not bloom, rub-off or extract during use. Articles, such as gloves made from the compositions of this invention and that meet ASTM examination standards for target tensile and elongation properties, will also have a surface resistivity value below $1 \times 10^{11}$ ohms/square, a static decay time of less than 1 second, or both.

The blends of the step (1) compositions and step (2) composition are particularly useful in the manufacture of articles such as gloves, by a coagulant dipping process, since they can readily coagulate on glove molds coated with salts such as calcium nitrate. This finding was unexpected, since PEG typically is used to make salt-stable latexes, i.e., latexes that do not coagulate readily. Coagulating dipping is well known to those skilled in the art of glove making and is described in the Kirk-Othmer Encyclopedia of Chemical Technology Third Edition, Vol. 20, pp. 453–454, as well as in the following examples. However, the step (1) and step (2) compositions can also be used in solvent dipping processes well known to those skilled in the art. Suitable solvents may be selected according to solubility of polymers and may include toluene, tetrahydrofuran, and N,N-dimethylformamide.

Also unexpected was the finding that the step (1) composition can be used without the step (2) composition in the coagulant dipping process, provided that the amount of at least one reactive macromer of at least one alkylene oxide having at least one functional group capable of free-radical transformation comprises less than about 10 wt. % of total polymer weight in the step (1) composition.

EXAMPLES

The following examples are presented for the purpose of illustrating the invention disclosed herein in greater detail. However, the examples are not to be construed as limiting the invention here in any manner, the scope of the invention being defined by the appended claims.

Test Methods

1. Surface Resistivity Measurements on Antistatic Films and Coatings

Equipment:
  Monroe Electronics Model 272 with Monroe 96101A-1 concentric ring probe (conforms to ASTM D257 and ESD 11.11 specification for 5lb. concentric ring probes).

Test Method:
  Place glove on insulated plate.
  Set meter to read "ohms/square @ 100 v".
  Place concentric ring on smooth glove surface; wait 30 to 60 seconds for reading.
  Record ohms/square @100 v.

2. Static Decay Measurements
Equipment: Monroe 268A+ charged plate monitor and male "banana plug" connected to AC ground.
Test Method:
Place glove on plate and fold glove in half so that fingers are on top.
Set meter to measure decay time from 1000 v to 100 v.
Charge plate to just over 1000 v.
Set plate control to "decay".
Using the "banana plug", touch the tip firmly to the top of the glove (usually one of the fingers, so that there are 4 layers of the glove between the plate and the grounding probe).
Record time.
3. Total solids was measured using a LabWave 9000.TM. (CEM Corporation) Moisture/Solids Analyzer
4. pH was measured using an Acumet Basic pH Meter (Fisher Scientific)
5. Brookfield viscosity was measured at 60 rpm using a Brookfield Viscometer (Brookfield Engineering Laboratories, Inc.)
6. Surface tension was measured using a Fisher Surface Tensiomat Model 21.
7. Particle size was measured using a Submicron Particle Sizer Autodilute.sup.PAT Model 370 (NICOMP Particle Sizing Systems).

Abbreviations

The following abbreviations are used in the examples below:
APS=ammonium persulfate
DMEA=dimethylethanolamine
DP=degree of polymerization
DTAHQ=2,5-di(tert-amyl) hydroquinone
EDTA Na$_3$=trisodium ethylenediaminetetraacetate trihydrate
MAA=methacrylic acid
MePEGMA=methoxypolyethylene glycol methacrylate, also known as methoxy polyethylene oxide (meth)acrylate
MMA=methyl (meth)acrylate
n-BA=n-butyl acrylate
SFS=sodium formaldehyde sulfoxylate
t-BHP=t-butyl hydroperoxide Example 1

Step (1) Latex Emulsion Copolymer of 10 Wt. % MePEGMA, Acrylonitrile, Butadiene and Methacrylic Acid A 3-liter pressure rated glass stirred reactor was charged with 563 grams soft water, 3.5 grams n-dodecyl mercaptan, 4.5 grams 20 wt. % aqueous solution of sodium n-dodecyl benzene sulfonate (as a surfactant), and 0.3 grams sodium salt of polymerized alkyl naphthalene sulfonic acid such as Daxad™ 17 (as a surfactant). A monomer premix was made using 1. 6 grams n-dodecyl mercaptan, 167 grams acrylonitrile, 120 grams 50 wt. % aqueous solution of MePEGMA with an average DP~20 ("DP~20" means having an average number of ethylene glycol units of about 20), 346 grams butadiene, and 28 grams methacrylic acid. A reducing solution was made by dissolving 0.8 gram EDTA Na$_3$ (as a chelator), 0.5 gram sodium ferric ethylenediaminetetraacetate (as a reducing agent), and 2.3 grams sodium formaldehyde sulfoxylate (as a reducing agent) in 72 grams water. A soap solution was made by mixing 86 grams 20 wt. % aqueous solution of sodium n-dodecyl benzene sulfonate, 5.5 grams sodium salt of polymerized alkyl naphthalene sulfonic acid, and 251 grams water. Prior to initiation, 5% of the total monomer premix weight was added to the reactor. At 35° C., a solution of 4 grams APS in 50 grams water was added to the reactor. Immediately following APS addition, the reducing solution was proportioned into the reactor over a period of about 6 hours. After 30 minutes, the remaining monomer premix and soap solution were proportioned into the reactor over a period of about 5 hours. When the premix and soap metering were complete, 30 grams 20 wt. % aqueous solution of sodium n-dodecyl benzene sulfonate, and a solution of 4 grams APS in 40 grams soft water was added to the reactor. Reaction temperature was increased to 45° C. When the monomer conversion to polymer reached 92%, a solution of 1 gram hydroxylamine sulfate in 35 grams water was added to stop the reaction and the reactor cooled to 30° C. The reactor was vented and the following added to the reactor: 75 grams 15 wt. % aqueous solution of 2-amino-2-methyl-1-propanol (as a pHing agent), 2 grams 50 wt. % aqueous solution of DTAHQ (as a shortstopping agent), and 6 grams 40 wt. % aqueous solution of 4,4'-thiobis(3-methyl-6-tertiary butyl phenol) (as an antioxidant). The residual monomers were removed by applying heat and vacuum.

The emulsion polymer obtained had 40 wt. % total solids, pH 8.2, 22 cP Brookfield viscosity, 34 dynes/cm surface tension, and 143 nm particle size.

An attempt to make a glove using the Example 1 latex and the compounding and coagulant dipping procedures of Example 5 failed because the latex did not coagulate on the glove former.

Example 2

Step (1) Latex Emulsion Copolymer of 10 Wt. % MePEGMA, Styrene, n-Butyl Acrylate, Methyl Methacrylate and Methacrylic Acid A monomer premix was made by mixing 150 grams water, 0.6 gram lithium hydroxide monohydrate, 11 grams disodium salt of dodecyl (sulfophenoxy) benzenesulfonic acid, 120 grams styrene, 288 grams n-butyl acrylate, 144 grams methyl methacrylate, 50 grams 50% aqueous solution of MePEGMA having an average number of ethylene glycol units of about 20 (or in other words DP~20), 3 grams N-dodecyl mercaptan, and 18 grams methacrylic acid. Initiator solution-A was made by dissolving 1.2 grams sodium persulfate in 18 grams water. Initiator solution-B was made by dissolving 1.5 grams sodium persulfate in 60 grams water. 480 grams water, 0.12 gram lithium hydroxide monohydrate, and 1.33 grams disodium salt of dodecyl (sulfophenoxy) benzenesulfonic acid were charged to a 3-liter reaction vessel and heated to 78° C. Initiator solution-A then was added to the reaction vessel, followed by proportioning the monomer premix into the reaction vessel over a period of about 3 hours. After 30 minutes, initiator solution-B was proportioned into the reaction vessel over a period of about 4 hours. After completion of the initiator feed, 20 grams 30% aqueous solution of lithium nitrate was added to the reaction vessel, and the temperature was maintained at 78 C for about one hour. The reaction vessel then was cooled to 40° C. 2.1 grams 17% aqueous solution of t-BHP (as an initiator) and 18.6 grams 2.2% aqueous solution of sodium metabisulfite (as a reducing agent) were added to the reaction vessel about 5 minutes apart. After about 30 minutes, the reaction vessel was cooled to room temperature and filtered through 100-micron cloth. The pH of the product emulsion was adjusted to about 8 using ammonium hydroxide.

The emulsion copolymer obtained had 43 wt. % total solids, 12 cP Brookfield viscosity, and 138 nm particle size.

Example 3

Step (2) Nitrile Rubber Copolymer Latex of Butadiene, Acrylonitrile and Methacrylic Acid A 15-gallon pressure-rated stainless steel stirred reactor was charged with 23,800 grams water, 10,180 grams butadiene, 4,130 grams acrylonitrile, 995 grams methacrylic acid, 7.7 grams EDTA $NA_3$, 660 grams 20 wt. % aqueous solution of sodium n-dodecyl benzene sulfonate, 115 grams sodium salt of polymerized alkyl naphthalene sulfonic acid, and 80 grams n-dodecyl mercaptan. At 35° C., a solution of 52 grams APS in 450 grams water was added to the reactor. When the monomer conversion reached 40%, 880 grams 20 wt. % aqueous solution of sodium n-dodecyl benzene sulfonate, 15 grams n-dodecyl mercaptan, and 200 grams water were added to the reactor. At 70% monomer conversion to copolymer, 880 grams 20 wt. % aqueous solution of sodium n-dodecyl benzene sulfonate, 31 grams n-dodecyl mercaptan, a solution of 25.9 grams SFS in 500 grams water, and 100 grams water were added to the reactor. When the monomer conversion reached 94%, a shortstop solution was added and the reactor cooled to 25° C. The reactor was vented and the following added to the reactor: 1,204 grams 15 wt. % aqueous solution of DMEA, 61 grams 50 wt. % aqueous solution of DTAHQ, and 153 grams 40 wt. % aqueous solution of 4,4'-thiobis(3-methyl-6-tertiary butyl phenol). The residual monomers were removed by applying heat and vacuum.

The emulsion copolymer obtained had 36 wt. % total solids, pH 8, 10 cP Brookfield viscosity, 29 dynes/cm surface tension, and 125 nm particle size.

Example 4

Blending of Step (1) and Step (2) Latexes

Step (1) polymer latexes from either Example 1 or Example 2 were blended with the step (2) nitrile rubber latex of Example 3 using mild agitation. The ratios of the step (1) to step (2) polymers ranged from 10%/90% respectively to 50%/50% respectively on a dry weight basis with 10% increments. Optionally, lithium nitrate was added to the Example 1 or Example 2 polymer latex prior to blending. The amount of lithium nitrate used is indicated in Table 3.

Example 5

Compounding and Coagulant Dipping Procedures to Make Antistatic Gloves

The blended latexes of Example 4 were compounded by sequential mixing of the following ingredients as indicated in Table 1 (the last four ingredients were solutions or dispersions):

TABLE 1

| Ingredient | Content (phr) | Weight (grams) |
| --- | --- | --- |
| Latex from Example 4 | 100 | 348.0 |
| Water | — | 11.0 |
| KOH (4 wt. %) | 0.7 | 26.2 |
| Butyl Zimate (50 wt. %) | 1 | 3.0 |
| Sulfur (68 wt. %) | 1 | 2.2 |
| Zinc Oxide (60 wt. %) | 1.3 | 2.5 |

The following procedure was used to make gloves from the above compounded latex:

Dip glove former into warm calcium nitrate solution with specific gravity range 1.14 to 1.22 gram/ml.

Thoroughly dry former at 140° F.

Dip glove former into latex compound. (Latex compound should be well mixed and should sit for one (1) day prior to dipping.)

Leach in warm water (1 20° F) for two minutes.

Dry and cure at 220° F.–260° F. for up to thirty minutes.

Leach at 90° F. for five minutes.

Strip glove from mold.

The ESD properties for gloves manufactured by the method above are presented in Tables 2, 3, and 5 (except for Examples 6 and 7 which are controls).

Examples 6–17

ESD Properties of Gloves

Examples 6 and 7 are controls. The glove in Example 6 was made from the step (2) nitrile rubber latex of Example 3 using the methods of Example 5. No step (1) latex was employed in Example 6. Example 7 is a comparison glove from Ansell obtained through commercial channels.

Examples 8 to 17 were performed using a step (1) polymer latex made by the method of Example 1 (except for variation of monomer concentrations on a dry weight basis as shown in the second and third columns of Table 2 below). The respective step (1) latexes in each example were blended with the step (2) nitrile rubber latex of Example 3 using the blending method of Example 4. Variations in amounts of step (1) latex are set forth in the fourth column of Table 2 below, with the relative amount of step (1) latex being expressed as a weight percentage of the blend of step (1) and step (2) latexes on a dry weight basis. The blend of step (1) and step (2) latexes then was compounded and used to make gloves according to the method of Example 5. Each glove was tested for surface resistivity and static decay as set forth in the fifth and sixth columns of Table 2 below.

Control Example 6 (containing no step (1) polymer) and control Example 7 (a comparative sample glove from Ansell) have inferior surface resistivity and static decay. In comparison, Examples 8–17 show superior static decay, surface resistivity, or both.

TABLE 2

| No. | MePEGMA (wt. % of step (1) latex)* | Butadiene (wt. % of step (1) latex)* | Step (1) Polymer (wt. % of blend with step (2) latex)** | Surface Resistivity (ohms/sq) of Glove | Static Decay (sec) of Glove |
| --- | --- | --- | --- | --- | --- |
| 6 | Latex from Example 3 | | 0 | 1.9E12 | 1.6 |
| 7 | Glove from Ansell | | — | 1.8E12 | 1.35 |
| 8 | 10 | 57.6 | 10 | 1.5E10 | 0.3 |
| 9 | 10 | 57.6 | 20 | 2.9E9 | 0.5 |
| 10 | 10 | 57.6 | 30 | 2.8E10 | 1.0 |
| 11 | 10 | 57.6 | 40 | 3.0E9 | 0.1 |
| 12 | 10 | 57.6 | 50 | 3.3E9 | 0.2 |
| 13 | 15 | 52.6 | 10 | 5.3E10 | 1.9 |
| 14 | 15 | 52.6 | 20 | 7.5E10 | 1.1 |
| 15 | 15 | 52.6 | 30 | 1.7E10 | 0.6 |
| 16 | 15 | 52.6 | 40 | 1.6E10 | 0.3 |
| 17 | 15 | 52.6 | 50 | 1.1E10 | 0.2 |

*All step (1) latexes contain 27.8 wt. % acrylonitrile and 4.6 wt. % methacrylic acid on a dry weight basis.
**All weight percentages are expressed on a dry weight basis.

Examples 18–22

Examples 18 to 21 were performed using a step (1) polymer latex made by the method of Example 2 (except for variation of monomer conentrations on a dry weight basis as shown in Table 3 below). In each of Examples 18 to 21, the total of all monomer weight percentages is 100 wt. % of each respective step (1) polymer. The step (1) latex of each example was blended with the step (2) nitrile rubber latex of Example 3 using the blending method of Example 4. The ratio of step (1) latex to step (2) latex was the same in each of Examples 18–21 and was about 1:4 on a dry weight basis. The blend of step (1) and step (2) latexes then was compounded and used to make gloves according to the method of Example 5. Each glove was tested for surface resistivity and static decay as set forth in the eighth and ninth columns of Table 3 below. Examples 18–21 show superior static decay, surface resistivity, or both.

As with Examples 18–21, the Example 22 total of all monomer weight percentages is 100 wt. % of the step (1) polymer. A polymer solution rather than a latex was produced. Then 2 wt. % of this Example 22 step (1) solution was blended with the step (2) nitrile rubber latex of Example 3 using the blending method of Example 4. The blend was then compounded and used to make a glove according to the method of Example 5. Tests of this glove for surface resistivity and static decay produced superior results that are set forth in the eighth and ninth columns of Table 3 below.

version reached 94%, a shortstop solution was added and the reactor cooled to 25° C. The reactor was vented and the following added to the reactor: 1,204 grams 15 wt. % aqueous solution of DMEA, 61 grams 50 wt. % aqueous solution of DTAHQ, and 153 grams 40 wt. % aqueous solution of 4,4'-thiobis(3-methyl-6-tertiary butyl phenol). The residual monomers were removed by applying heat and vacuum.

The emulsion polymer obtained had 36 wt. % total solids, pH 8, 10 cP Brookfield viscosity, 29 dynes/cm surface tension, and 125 nm particle size.

Example 24

Step (1) Latex Emulsion Copolymer of 1 Wt. % MePEGMA, Butadiene, Acrylonitrile and Methacrylic Acid An emulsion copolymer was prepared in a manner identical to Example 23 with the exception that 306 grams 50 wt. % aqueous solution of MePEGMA with an average DP~20, and 10,022 grams butadiene were used, and the latex was neutralized with 1,182 grams 15 wt. % aqueous solution of 2-amino-2-methyl-1-propanol instead of DMEA.

The emulsion polymer obtained had 36 wt. % total solids, pH 8.2, 11 cP Brookfield viscosity, 32 dynes/cm surface tension, and 122 nm particle size.

TABLE 3

| Ex. No. | MePEGMA (wt. %) | n-BA (wt. %) | Styrene (wt. %) | MMA (wt. %) | MAA (wt. %) | LiNO$_3$ (wt. %)* | Surface Resistivity (Ohms/sq) of Glove | Static Decay (sec) of Glove |
|---|---|---|---|---|---|---|---|---|
| 18 | 10  | 43 | 20 | 24 | 3 | 1    | 1.1 E8  | 0.1  |
| 19 | 10  | 43 | 20 | 24 | 3 | 2    | 4.4 E8  | 0.1  |
| 20 | 15  | 50 | 14 | 18 | 3 | 1.25 | 1.2 E8  | 0.1  |
| 21 | 15  | 58 | 10 | 14 | 3 | 2    | 6.4 E9  | 0.13 |
| 22 | 100 | 0  | 0  | 0  | 0 | 1    | 3.1 E10 | 0.16 |

*Lithium nitrate concentration is expressed as wt. % based on 100 wt. % total amount of step (1) monomers.

Example 23

Step (1) Latex Emulsion Copolymer of 0.5 Wt. % MePEGMA, Butadiene, Acrylonitrile and Methacrylic Acid A 15-gallon pressure-rated stainless steel stirred reactor was charged with 23,800 grams water, 10,100 grams butadiene, 4,130 grams acrylonitrile, 995 grams methacrylic acid, 153 grams 50 wt. % aqueous solution of MePEGMA having an average number of ethylene glycol units of about 20 (or in other words or in other words DP~20), 7.7 grams EDTA NA$_3$, 660 grams 20 wt. % aqueous solution of sodium n-dodecyl benzene sulfonate, 115 grams sodium salt of polymerized alkyl naphthalene sulfonic acid, and 80 grams n-dodecyl mercaptan. At 35° C., a solution of 52 grams APS in 450 grams water was added to the reactor. When the monomer conversion to copolymer reached 40%, 880 grams 20 wt. % aqueous solution of sodium n-dodecyl benzene sulfonate, 15 grams n-dodecyl mercaptan, and 200 grams water were added to the reactor. At 70% conversion, 880 grams 20 wt. % aqueous solution of sodium n-dodecyl benzene sulfonate, 31 grams n-dodecyl mercaptan, a solution of 25.9 grams SFS in 500 grams water, and 100 grams water were added to the reactor. When the monomer con-

Example 25

Step (1) Latex Emulsion Copolymer of 1.5 Wt. % MePEGMA, Butadiene, Acrylonitrile and Methacrylic Acid An emulsion copolymer was prepared in a manner identical to Example 23 with the exception that 459 grams 50 wt. % aqueous solution of MePEGMA with an average DP~20, and 9,945 grams butadiene were used, and the latex was neutralized with 920 grams 15 wt. % 2-amino-2-methyl-1-propanol.

The emulsion polymer obtained had 39 wt. % total solids, pH 8.3, 22 cP Brookfield viscosity, 32 dynes/cm surface tension, and 131 nm particle size.

Example 26

Step (1) Latex Emulsion Copolymer of 2 Wt. % MePEGMA, Butadiene, Acrylonitrile and Methacrylic Acid An emulsion copolymer was prepared in a manner identical to Example 23 with the exception that 581 grams 50 wt.

% aqueous solution of MePEGMA with an average DP~20, and 9,880 grams butadiene were used, and the latex was neutralized with 1,050 grams 15 wt. % aqueous solution of 2-amino-2-methyl-1-propanol.

The emulsion polymer obtained had 40 wt. % total solids, pH=8.1,16 cP Brookfield viscosity, 32 dynes/cm surface tension, and 132 nm particle size.

Example 27

Step (1) Latex Emulsion Copolymer of 2 Wt. % MePEGMA, Butadiene, Acrylonitrile and Methacrylic Acid A 15-gallon pressure-rated stainless steel stirred reactor was charged with 23,800 grams water, 8,430 grams butadiene, 6,120 grams acrylonitrile, 460 grams methacrylic acid, 581 grams 50 wt. % aqueous solution of MePEGMA with an average DP~20, 7.7 grams EDTA Na$_3$, 1,020 grams 20 wt. % aqueous solution of sodium n-dodecyl benzene sulfonate, 115 grams sodium salt of polymerized alkyl naphthalene sulfonic acid, and 107 grams n-dodecyl mercaptan. At 35° C., a solution of 49 grams APS in 450 grams water was added to the reactor. When the monomer conversion to copolymer reached 40%, 920 grams 20 wt. % aqueous solution of sodium n-dodecyl benzene sulfonate, 15 grams n-dodecyl mercaptan, and 200 grams water were added to the reactor. At 70% conversion, 550 grams 20 wt. % aqueous solution of sodium n-dodecyl benzene sulfonate, 46 grams n-dodecyl mercaptan, a solution of 17 grams SFS in 500 grams water, and 100 grams water were added to the reactor. When the monomer conversion reached 94%, a shortstop solution was added and the reactor cooled to 25° C. The reactor was vented and the following added to the reactor: 850 grams 15 wt. % aqueous solution 2-amino-2-methyl-1-propanol, 61 grams 50 wt. % aqueous solution of DTAHQ, and 153 grams 40 wt. % aqueous solution of 4,4'-thiobis(3-methyl-6-tertiary butyl phenol). The residual monomers were removed by applying heat and vacuum.

The emulsion polymer obtained had 45 wt. % total solids, pH 8.2, 20 cP Brookfield viscosity, 32 dynes/cm surface tension, and 126 nm particle size.

Example 28

Step (1) Latex Emulsion Copolymer of 1 Wt. % MePEGMA, Butadiene, Acrylonitrile, Methacrylic Acid, and Methyl Methacrylate A 15-gallon pressure-rated stainless steel stirred reactor was charged with 27,900 grams water, 10,247 grams butadiene, 4,374 grams acrylonitrile, 608 grams methacrylic acid, 324 grams 50 wt. % aqueous solution of MePEGMA with an average DP~20, 810 grams methyl methacrylate, 8.1 EDTA Na$_3$, 699 grams 20 wt. % aqueous solution of sodium n-dodecyl benzene sulfonate, 122 grams sodium salt of polymerized alkyl naphthalene sulfonic acid, and 85 grams n-dodecyl mercaptan. At 35° C., a solution of 55 grams APS in 450 grams water was added to the reactor. When the monomer conversion to copolymer reached 40%, 932 grams 20 wt. % aqueous solution of sodium n-dodecyl benzene sulfonate, 16 grams n-dodecyl mercaptan, and 200 grams water were added to the reactor. At 70% conversion, 932 grams 20 wt. % aqueous solution of sodium n-dodecyl benzene sulfonate, 32 grams n-dodecyl mercaptan, a solution of 27.5 grams SFS in 500 grams water, and 100 grams water were added to the reactor. When the monomer conversion reached 91%, a shortstop solution was added and the reactor cooled to 25° C. The reactor was vented and the following added to the reactor: 518 grams 20 wt. % aqueous solution of 2-amino-2-methyl-1-propanol, 65 grams 50 wt. % aqueous solution of DTAHQ, and 162 grams 40 wt. % aqueous solution of 4,4'-thiobis(3-methyl-6-tertiary butyl phenol). The residual monomers were removed by applying heat and vacuum.

The emulsion polymer obtained had 36 wt. % total solids, pH 8.2, 10 cP Brookfield viscosity, 33 dynes/cm surface tension, and 123 nm particle size.

Example 29

Step (1) Latex Emulsion Copolymer of 2 Wt. % MePEGMA, Butadiene, Acrylonitrile and Methacrylic Acid A 15-gallon pressure-rated stainless steel stirred reactor was charged with 27,900 grams water, 7,630 grams butadiene, 7,290 grams acrylonitrile, 972 grams methacrylic acid, 8.1 EDTA Na$_3$, 769 grams 20 wt. % aqueous solution of sodium n-dodecyl benzene sulfonate, 122 grams sodium salt of polymerized alkyl naphthalene sulfonic acid, and 85 grams n-dodecyl mercaptan. At 35° C., a solution of 55 grams APS in 450 grams water was added to the reactor. When the monomer conversion to copolymer reached 40%, 932 grams 20 wt. % aqueous solution of sodium n-dodecyl benzene sulfonate, 308 grams 50 wt. % aqueous solution of MePEGMA with an average DP~7, 16 grams n-dodecyl mercaptan, and 200 grams water were added to the reactor. At 70% conversion, 932 grams 20 wt. % aqueous solution of sodium n-dodecyl benzene sulfonate, 32 grams n-dodecyl mercaptan, a solution of 27.5 grams SFS in 500 grams water, and 100 grams water were added to the reactor. When the monomer conversion reached 94%, a shortstop solution was added and the reactor cooled to 25° C. The reactor was vented and the following added to the reactor: 2,258 grams 20 wt. % aqueous solution of 2-amino-2-methyl-1-propanol, 65 grams 50 wt. % solution of 2,5-di(tert-amyl) hydroquinone (DTAHQ), and 162 grams 40 wt. % solution of 4,4'-thiobis(3-methyl-6-tertiary butyl phenol). The residual monomers were removed by applying heat and vacuum.

The emulsion polymer obtained had 38 wt. % total solids, pH 8.2, 225 cP Brookfield viscosity, 34 dynes/cm surface tension, and 140 nm particle size.

Examples 30–34

Step (1) Latex Emulsion Copolymers of 2 to 6 Wt. % MePEGMA, Butadiene, Acrylonitrile and Methacrylic Acid The emulsions of Examples 30–34 were prepared in a manner identical to Example 29, except for the differences in the variables listed in Table 4. The levels of each monomer unit in their respective copolymers are based on the dry weight of the respective copolymers. All of the emulsions were neutralized with 2-amino-2-methyl-1-propanol to pH of about 8.0–8.5.

TABLE 4

| Ex. No. | MePEGMA (wt. % of step (1) latex)* | MePEGMA average degree of polymerization | Butadiene (wt. % of step (1) latex)* | Acrylonitrile (wt. % of step (1) latex)* | MMA (wt. % of step (1) latex* | MAA (wt. % of step (1) latex)* | Timing of MePEGMA Addition (at % conversion to copolymer) |
|---|---|---|---|---|---|---|---|
| 23 | 0.5 | 20 | 66   | 27 | 0 | 6.5 | 0 |
| 24 | 1   | 20 | 65.5 | 27 | 0 | 6.5 | 0 |
| 25 | 1.5 | 20 | 65   | 27 | 0 | 6.5 | 0 |
| 26 | 2   | 20 | 64.6 | 27 | 0 | 6.5 | 0 |
| 27 | 2   | 20 | 55   | 40 | 0 | 3   | 0 |
| 28 | 1   | 20 | 63   | 27 | 5 | 4   | 0 |
| 29 | 2   | 7  | 47   | 45 | 0 | 6   | 44 |
| 30 | 2   | 7  | 67   | 27 | 0 | 4   | 70 |
| 31 | 2   | 45 | 67   | 27 | 0 | 4   | 0 |
| 32 | 4   | 20 | 65   | 27 | 0 | 4   | 41 |
| 33 | 6   | 7  | 63   | 27 | 0 | 4   | 0 |
| 34 | 6   | 7  | 43   | 45 | 0 | 6   | 70 |

*All weight percentages are expressed on a dry weight basis.

Each step (1) latex of Examples 23–34 was compounded and used to make gloves according to the method of Example 5. Each glove was tested for surface resistivity and static decay, and test results are set forth in the second and third columns of Table 5 below.

Example 35

Step (1) Latex Emulsion Copolymer of 5 Wt. % MePEGMA, Styrene, Butadiene, Methacrylic Acid Example 35 was performed using a step (1) polymer latex made by the method of Example 1, except that the following monomer amounts were used: 65.4 wt. % Butadiene, 25 wt. % Styrene, 4.6 wt. % Methacrylic Acid, and 5 wt. % MePEGMA (DP~20). The step (1) latex of Example 35 was blended with the step (2) nitrile rubber latex of Example 3 in a 1:1 weight ratio by the method of Example 4. The blend was compounded and used to make glove according to the method of Example 5. The glove was tested for surface resisivity and static decay, and test results are set forth in the second and third columns of Table 5 below.

Control Example 6 (containing no step (1) polymer) and Control Example 7 (a comparative sample glove from Ansell) have inferior surface resistiviy and static decay. It is also noted that an attempt failed to make a glove using the step (1) latex of Example 1 (copolymer of 10% MePEGMA, acrylonitrile, butadiene and methacrylic acid) using the compounding and coagulate dipping procedures of Example 5, since the latex did not coagulate on the glove former. In comparison, Examples 23–35 show superior surface resistivity, static decay, or both.

TABLE 5

| Example No. | Surface Resistivity (ohms/sq) of Glove | Static Decay (sec) of Glove |
|---|---|---|
| 6 (Latex from Example 3) | 1.9E12 | 1.6 |
| 7 (Glove from Ansell) | 1.8E12 | 1.35 |
| 23 | 1.7E11 | 0.7 |
| 24 | 2.0E10 | 0.63 |
| 25 | 2.8E9 | 0.13 |
| 26 | 2.5E9 | 0.17 |
| 27 | 1.4E9 | 0.13 |
| 28 | 9.0E10 | 0.3 |
| 29 | 7.4E10 | 0.03 |
| 30 | 3.5E10 | 0.13 |
| 31 | 4.3E10 | 0.13 |
| 32 | 1.1E11 | 0.37 |
| 33 | 3.8E10 | 0.1 |
| 34 | 9.7E7 | <0.1 |
| 35 | 3.2E7 | <0.1 |

Example 36
Core-hell Emulsion Polymerization as Comparison

In a comparison example, 80 wt. % of the nitrile rubber latex made in Example 3 was used as seeds, and 20 wt. % of the monomer mixture used in Example 18 was polymerized over the seeds in an emulsion polymerization process.

A monomer premix was made by mixing 175 grams water, 0.7 gram lithium hydroxide monohydrate, 12.4 grams disodium salt of dodecyl (sulfophenoxy) benzenesulfonic acid, 24 grams styrene, 60.2 grams n-butyl acrylate, 28.57 grams 50 wt. % aqueous solution of MePEGMA, 33.6 grams methyl methacrylate, 0.7 gram n-dodecyl mercaptan, and 4.2 grams methacrylic acid. Initiator solution-A was made by dissolving 1.4 grams sodium persulfate in 21 grams water. Initiator solution-B was made by dissolving 1.75 grams sodium persulfate in 35 grams water. 1.56 grams disodium salt of dodecyl (sulfophenoxy) benzenesulfonic acid and 1400 grams emulsion copolymer (40% solids) made in Example 3 were charged to a 3-liter reaction vessel and heated to 78° C. Initiator solution-A was then added to the reaction vessel, followed by proportioning the monomer premix and initiator solution-B into the reaction vessel for a period of one hour and 2.5 hours respectively. After completion of the initiator feed, 23.3 grams 30 wt. % aqueous solution of lithium nitrate was added to the reaction vessel, and the temperature was maintained at 78° C. for about one hour. The reaction vessel was then cooled to 400 C. 2.2 grams 17 wt. % aqueous solution of t-BHP and 21.7 grams 3.2% aqueous solution of sodium meta-bisulfite were added to the reaction vessel. After 30 minutes, the reaction vessel was cooled to room temperature, and the emulsion was filtered through 100-micron cloth.

An attempt to make a glove using the Example 36 latex and the compounding and coagulant dipping procedures of Example 5 failed because the latex did not coagulate on the glove former.

Example 37
Core-shell Emulsion Polymerization as Comparison

The process was the same as that of Example 36, except that 20 wt. % of the monomer mixture used in Example 20 was polymerized over 80 wt. % of the nitrile rubber latex made in Example 3.

An attempt to make a glove using the Example 37 latex and the compounding and coagulant dipping procedures of Example 5 failed because the latex did not coagulate on the glove former.

While in accordance with the patent statutes the best mode and preferred embodiment has been set forth, the scope of the invention is not limited thereto, but rather by the scope of the attached claims.

What is claimed is:

1. A copolymer comprising:
   polymerized units consisting essentially of:
   (a) at least one reactive macromer of at least one alkylene oxide having at least one functional group which is capable of free-radical transformation, wherein said macromer comprises less than 10 wt. % of total copolymer weight and has a number average molecular weight from about 100 to about 10,000, and said macromer has the formula:

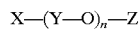
   $$X—(Y—O)_n—Z$$

wherein Y is a straight or branched chain alkylene radical having 1 to 6 carbon atoms, X is a functional group capable of free-radical transformation selected from a radical of the formula $H_2C=CHC(O)O$, $H_2C=C(CH_3)C(O)O—$, $CH_2=CHCH_2O—$, $H_2C=CHO—$, $H_2C=CHSO_3—$, vinylbenzyl and mercaptan, Z is H, $C_mH_{2m+1}$, phosphate, or the same as X, mi is 1 to 3, and n varies in order to achieve said number average molecular weight; and
   (b) 0 wt. % to 10 wt. % of one or more ethylenically unsaturated monomers having at least one carboxylic acid group; and
   (c) one or more radically polymerizable comonomers, wherein said comonomer comprises one or more of acrylic acid esters, unsaturated nitrites, styrenic monomers, vinyl esters, vinyl ethers and conjugated dienes; and wherein said copolymer is coagulable.

2. A copolymer of claim 1, wherein Y has 2 to 4 carbon atoms and Z is hydrogen or methyl.

3. A copolymer of claim 2, wherein said copolymer comprises polymerized units of methoxy polyethylene oxide (meth)acrylate macromer and at least one other comonomer, and said macromer has a number average molecular weight from about 100 to about 5,000.

4. A copolymer of claim 3, wherein said ethylenically unsaturated monomer having at least one carboxylic acid group comprises acrylic acid, methacrylic acid or a mixture thereof.

5. A copolymer of claim 4, wherein X comprises acrylate or methacrylate, and said other comonomer comprises one or more of butadiene, acrylonitrile, styrene, methyl methacrylate, and n-butyl acrylate.

6. A copolymer of claim 1, wherein said copolymer is in latex or dispersion form.

* * * * *